(12) United States Patent
Cok et al.

(10) Patent No.: US 8,488,163 B2
(45) Date of Patent: *Jul. 16, 2013

(54) PRINTING VARIABLE DATA ON A VARIETY OF DIFFERENT PRE-PRINTED STOCKS

(75) Inventors: Ronald S. Cok, Rochester, NY (US); Peter W. Hoppner, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 488 days.

This patent is subject to a terminal disclaimer.

(21) Appl. No.: 12/789,515

(22) Filed: May 28, 2010

(65) Prior Publication Data

US 2011/0292435 A1 Dec. 1, 2011

(51) Int. Cl.
*G06K 15/00* (2006.01)
(52) U.S. Cl.
USPC ........ 358/1.15; 358/1.13; 358/1.14; 358/1.16
(58) Field of Classification Search
None
See application file for complete search history.

(56) References Cited

U.S. PATENT DOCUMENTS

| | | | |
|---|---|---|---|
| 5,129,639 A | 7/1992 | DeHority | |
| 5,984,193 A | 11/1999 | Uhling | |
| 6,647,222 B1 | 11/2003 | Digby | |
| 6,726,357 B2 | 4/2004 | Luque | |
| 6,823,147 B2 | 11/2004 | Jackelen et al. | |
| 6,898,395 B2 | 5/2005 | Mui et al. | |
| 7,116,343 B2 | 10/2006 | Botten et al. | |
| 7,630,519 B2 | 12/2009 | Nagarajan | |
| 2003/0117639 A1* | 6/2003 | Milton et al. | 358/1.13 |
| 2004/0179219 A1* | 9/2004 | Wong et al. | 358/1.13 |
| 2008/0240751 A1 | 10/2008 | Miyata | |
| 2010/0296830 A1* | 11/2010 | Kamata | 399/81 |

* cited by examiner

*Primary Examiner* — Marivelisse Santiago Cordero
*Assistant Examiner* — Kent Yip
(74) *Attorney, Agent, or Firm* — Eugene I. Shkenko; Amit Singbal

(57) ABSTRACT

A printing apparatus for variable pre-printed stock comprises storage for customer data, a variety of different pre-printed stocks, printer trays for holding the pre-printed stocks, a scanner for scanning the printed area of each of the pre-printed stocks and for producing tray stock information identifying each of the pre-printed stocks, storage for electronic customer orders, each electronic customer order including one or more of the customer data and selection data for one or more of the pre-printed stocks, a controller for receiving the tray stock information and the electronic customer orders, for matching the tray stock information to the electronic customer orders to produce a match between each pre-printed stock and corresponding tray stock information and for producing print instructions for the match, and a printer for receiving the print instructions and for printing the customer data corresponding to the match onto the matched pre-printed stock.

18 Claims, 3 Drawing Sheets

PRINTING VARIABLE DATA ON A VARIETY OF DIFFERENT PRE-PRINTED STOCKS

CROSS REFERENCE TO RELATED APPLICATION

Reference is made to commonly assigned, co-pending U.S. patent application Ser. No. 12/789,519 by Ronald S. Cok filed of even date herewith entitled "Printer With In-Line Scanner", the disclosure of which is incorporated herein by reference in its entirety.

FIELD OF THE INVENTION

The present invention relates to printing variable data on a variety of different pre-printed stocks.

BACKGROUND OF THE INVENTION

Customized mailings and products for consumers can be manufactured by printing variable data on stock material, such as paper. Such print systems typically use a printer having a paper feed path from a media tray holding standardized stock material and an electronically stored data base of customer information. The customer information is printed on the stock material and delivered to the customers. This method is effective for standardized stock material that does not vary or depend on the customer information.

However, there are applications for a variety of different stock materials having custom, pre-printed portions. For example, paper stock that has a printed metal film with a text message outline cannot easily be printed using conventional ink-printing equipment. In this case, customized stock must first be produced using a different printing process and, subsequently, the customized stock is handled and printed with customer data. Each customized stock can have a different stock keeping unit (SKU), quantities of each customized stock element can be very small, and the process by which customer information is printed on the customized stock element can entail a great deal of human handling by printing staff. Hence, printing such products can entail a great deal of work and is prone to error. Furthermore, while paper size, type, and orientation can be properly established and manually entered into a printer memory or connected computer, it is desirable to automate such tasks to prevent errors.

Printers can employ sensors for improving the handling of paper in a paper feed path but these are not useful for identifying or managing stock types. While a printer can have several stock media trays to provide stock to the printer and can have information identifying the stock media (for example as described in U.S. Pat. No. 6,647,222), the stock type information needs to be provided via user or operator input. Several problems may result due to user error in entering an incorrect media type and/or loading incorrect media in the paper drawer or tray.

To some extent, this problem has been recognized in the prior art. U.S. Pat. No. 6,823,147 describes a method for detecting mismatches between printer resources and requirements. U.S. Pat. No. 5,129,639 describes a method of finding the best match for a printer, the job printer requirements, and the printer's paper capabilities or stocks. However, these approaches do not necessarily provide what a customer desires.

U.S. Pat. No. 5,984,193 describes a scannable bar code pattern printed on a sheet of printer media or on a sheet attached to such media. The bar code is then read by a bar code scanner to identify the media and corresponding customer variable information can then be printed on the stock media. This method, however, requires a process for back printing unique codes on the stock in either visible or invisible ink, increasing the cost of the stock. If the bar code is visible, it precludes the possibility of a product printed on both sides of the stock, reducing customer satisfaction with the product. U.S. Pat. No. 6,726,357 describes identifying media by a heat signature. However, if the same media with customized text, for example, is employed, it is unlikely that the customized media can be distinguished by a thermal signature.

There is a need, therefore, for an improved apparatus for printing variable customer information on to a variety of different pre-printed stocks.

SUMMARY OF THE INVENTION

In accordance with the present invention, there is provided a printing apparatus for variable pre-printed stock, comprising storage for customer data, pre-printed stocks having a decorative printed area and an open area on a common side of the pre-printed stock. Printer trays hold one of the pre-printed stocks; a scanner scans the pre-printed stocks to produce tray stock information that identifies the pre-printed stocks. Electronic customer orders include one or more of the customer data and selection data for one or more of the pre-printed stocks and are stored in the apparatus. A controller receives the tray stock information and the electronic customer orders for matching the tray stock information to the electronic customer orders to produce a match, and for producing print instructions for the match. A printer receives the print instructions and prints the customer data onto pre-printed stock identified by the match. The customer data can include digital images or text. Printed areas of the stock are printed with metal film.

Another preferred embodiment of the present invention includes a method of printing customer data on pre-printed stock. This includes loading pre-printed stocks into a printer wherein the pre-printed stock has an open area and a decorative printed area. One or more of the pre-printed stocks are scanned and identified so that the stock tray information can be stored. A plurality of different electronic orders are received in the printer, with each order identifying one or more of the pre-printed stocks and including customer data. A controller matches the stock tray information with one of the plurality of different electronic orders to form a match. Print instructions based on the match are generated and sent to the printer. The customer data corresponding to the match are printed onto the matched pre-printed stock.

Another preferred embodiment of the present invention includes a printing apparatus comprising stock trays. Sensors detect that the stock supply trays are loaded with stock. A controller coupled to the sensors receives sensor information indicating that the stock supply trays are loaded with stock. A scanner scans the stock and produces tray stock information for identifying the stock.

The present invention has the advantage that variable customer information can be printed on variable pre-printed stock without requiring operator intervention. These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
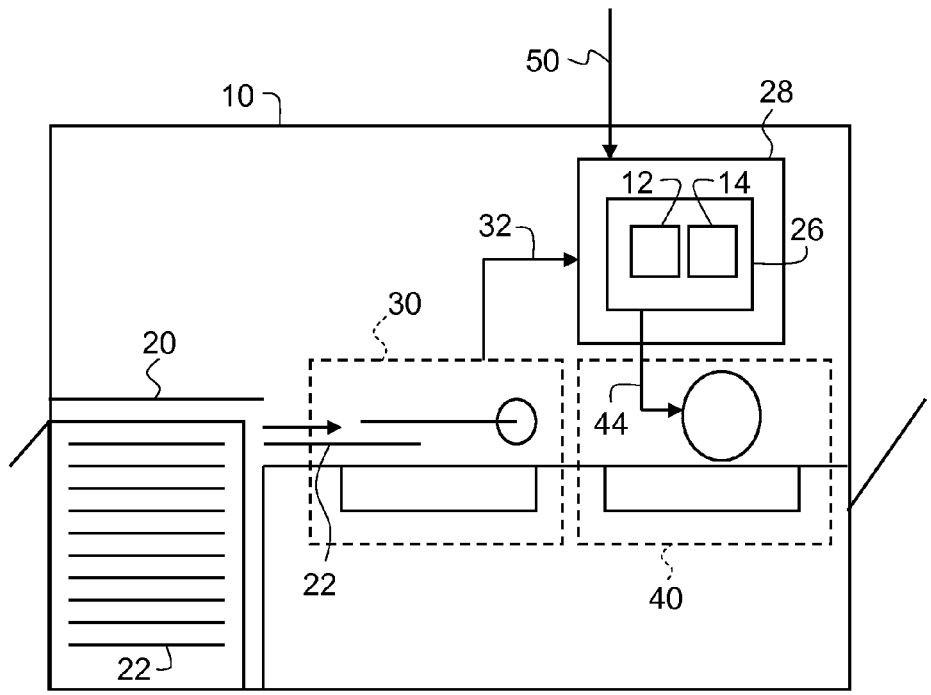
FIG. 1 is a schematic illustration of a printing apparatus in accordance with an embodiment of the present invention.
Figure 2:
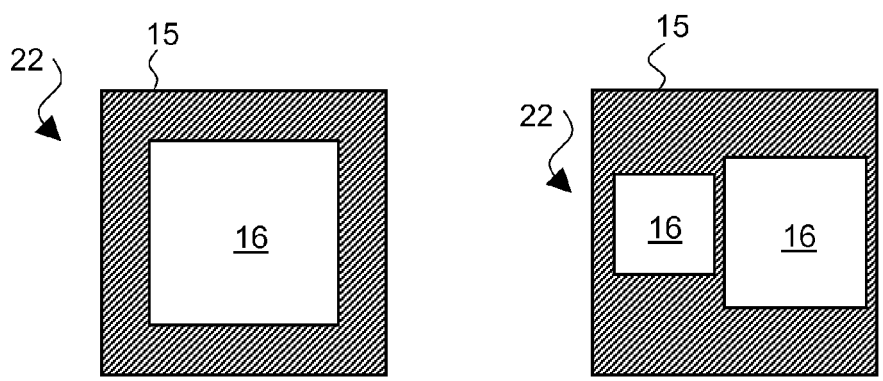
FIG. 2 is a schematic illustration of a pre-printed stock useful with various embodiments of the present invention.
Figure 3:
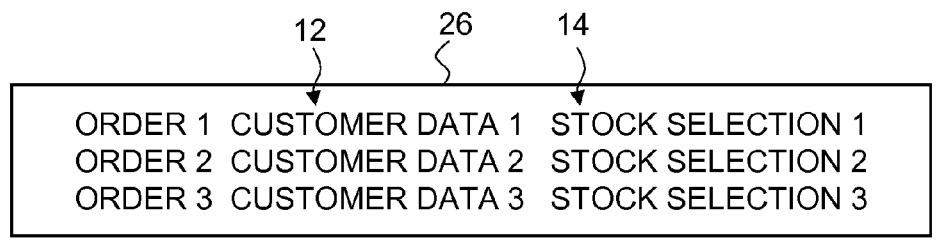
FIG. 3 is a schematic illustration of an electronic order in accordance with an embodiment of the present invention.

Referring to FIG. 1, in one embodiment of the present invention, a printing apparatus 10 for variable pre-printed stock comprises storage for customer data 12 and pre-printed stocks 22. Referring to FIG. 2, each pre-printed stock 22 has a decorative printed area 15 and one or more open areas 16 on a common side of the pre-printed stock 22. In one preferred embodiment of the present invention, the printed areas are printed with a metal film such as a colored foil. The foil surface is incompatible with the printing inks and toners. They are incompatible to the extent that the media doesn't adhere well to the metal foil surface and can undergo smearing or peeling. Referring back to FIG. 1, a printer tray 20 holds the pre-printed stocks 22. A scanner 30 scans the common side of the pre-printed stocks including the printed area 15 of each of the pre-printed stocks 22 and produces tray stock information 32 that identifies each of the pre-printed stocks 22. Electronic customer orders 26 are stored in the printing apparatus 10. Referring to FIG. 3, each electronic customer order 26 includes one or more of the customer data 12 and selection data 14 for one or more of the pre-printed stocks 22.

The customer orders can be generated electronically, for example though an on-line web page wherein a web user selects a product and transmits the order including customer data. The orders can include a selection of the product type (including a pre-printed stock), a customer digital image, and customer-selected text. The selection of a pre-printed stock 22 is typically made by reviewing images of the pre-printed stock on a web page and selecting the preferred pre-printed stock compatible with the product, for example choosing on the basis of color, theme, and included text. The selected pre-printed stock has an identifier supplied by the manufacturer (e.g. a text string of mixed numbers and letters) that is then included in the customer order and electronically submitted to the printing apparatus. In a more sophisticated embodiment of the present invention, a customer could specify desired attributes of the pre-printed stock rather than identifying the pre-printed stock itself. The attributes can then be included in the electronic customer order and matched to a corresponding pre-printed stock by the printing apparatus of the present invention. For example, keywords can be stored at the printing apparatus corresponding to a supply of pre-printed stock which are then matched to desired attributes submitted by customers.

Figure 4:
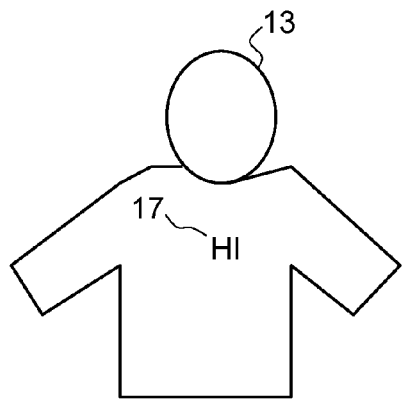
FIG. 4 is a schematic illustration of a digital image with text useful with various embodiments of the present invention.

Referring back to FIG. 1, a controller 28 receives the tray stock information 32 and the electronic customer orders 26, for matching the tray stock information 32 to the electronic customer orders 26 to produce printing instructions 44 for the match. A printer 40 coupled to the controller receives the printing instructions 44 and prints the customer data 12 corresponding to the match onto the matched pre-printed stock 22. In one embodiment of the present invention illustrated in FIG. 4, the customer data 12 includes digital images 13, or text 17, or both.

Figure 5:
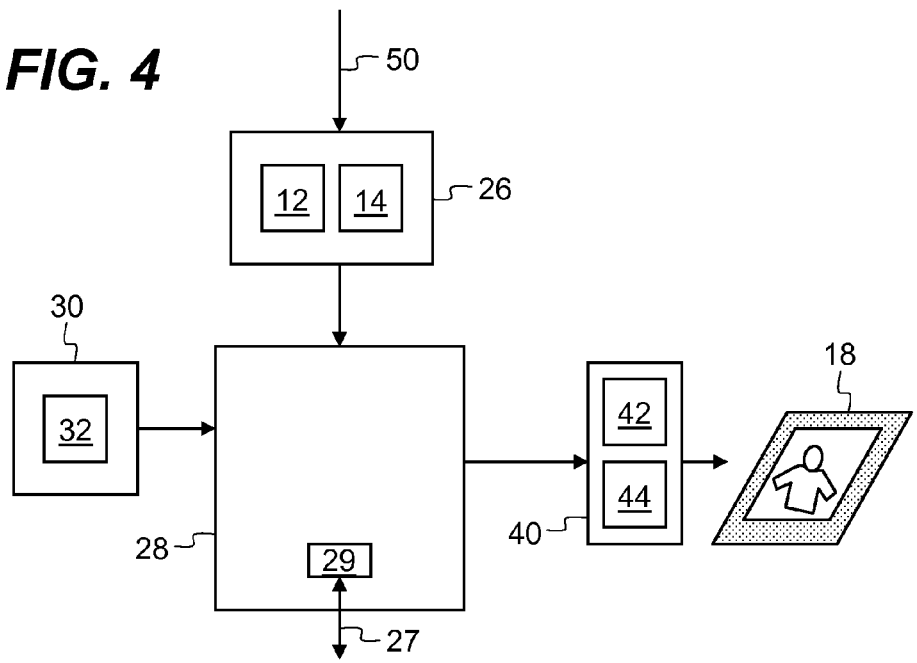
FIG. 5 is a schematic illustration of a portion of a printing apparatus in accordance with an embodiment of the present invention.

Referring to FIG. 5 in more detail, the controller 28 receives electronic customer order 26 information from a computer network 50, the internet, a local computer station, or a portable memory device coupled indirectly to the controller. The electronic customer order 26 information includes customer data 12 and a selection 14 of pre-printed stock. Generally, the customer data 12 includes variable data specific to the customer (e.g. digital images supplied by the customer). The selection 14 of pre-printed stock can be a template selected by the customer into which the customer's digital image is composited and printed in the open area of a pre-printed stock. However, as intended by embodiments of the present invention, a great variety of pre-printed stocks are available, for example including different shapes, colors, pre-printed inks, and pre-printed messages.

The scanner 30 scans pre-printed stock and, using any of a number of known pattern matching algorithms, identifies the pre-printed stock type by comparing these scanned images to a database of known pre-printed stock items and provides the corresponding tray stock information 32 to the controller 28. (The controller 28 can alternatively perform this task using pre-printed stock images provided by the scanner 30.) The controller 28 can include an operator interface 29 that communicates with an operator with messages 27, e.g. warning messages, status reports, error indicators, and the like. The controller 28 can include programming for communicating an error, for example, if there is no match between the selection 14 of pre-printed stock and the tray stock information 32 or if no appropriate pre-printed stock is loaded in the printer tray.

The scanner 30 (or related controller 28) system can include a database of stored images of pre-printed stock or image information that identifies or describes each pre-printed stock and serves as a basis for comparison with a scanned image of each pre-printed stock from the printer tray. The scanned image is compared with stored database image information to identify the pre-printed stock. Such comparisons can be done using image processing hardware designed for pattern matching and can include comparing the printed areas of the stored image with the printed areas of the scanned image. The comparisons can include color, shape of printed areas, objects found in the scanned image, and so on as is known in the image processing arts. Once a match between the scanned image and the stored database image is found, a pre-printed stock identifier is then stored as part of the tray stock information.

Figure 6:
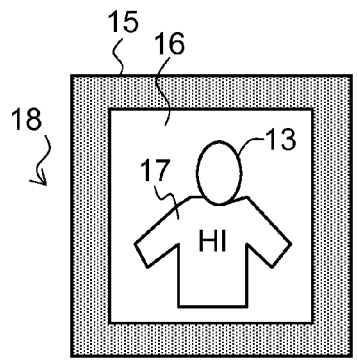
FIG. 6 is a schematic illustration of a product made according to an embodiment of the present invention.

The controller 28 attempts to match one of the pre-printed stock identified in the tray stock information 32 with a pre-printed stock selection 14 found within an electronic customer order 26. The match can be a precise identification of the pre-printed stock or a match of a description of the pre-printed stock. When a match 42 is found, the controller 28 creates printing instructions 44 that are transmitted with the matching information (e.g. including the customer data and pre-printed stock information) to the printer 40. The printer 40 then employs the printing instructions 44 to print the customer data 12 within the open area or areas 16 of the pre-printed stock to form a printed image product 18 that contains the customer data 12 (e.g. a digital image 13 and/or text 17), shown in more detail in FIG. 6.

Printing and scanning equipment are known in the art, as are controllers, printer trays, mechanisms for picking and feeding stock, and controllers with computing and memory resources for receiving customer order information, digital images, and tray stock information.

The apparatus and method of the present invention is particularly useful when the variable customer data printer 40 cannot print on the printed areas 15 of the pre-printed stock 22 due to its physical incompatibility with printer ink or toner. In one example, the printed areas 15 are printed with a material other than ink, for example a metal film.

Figure 7:
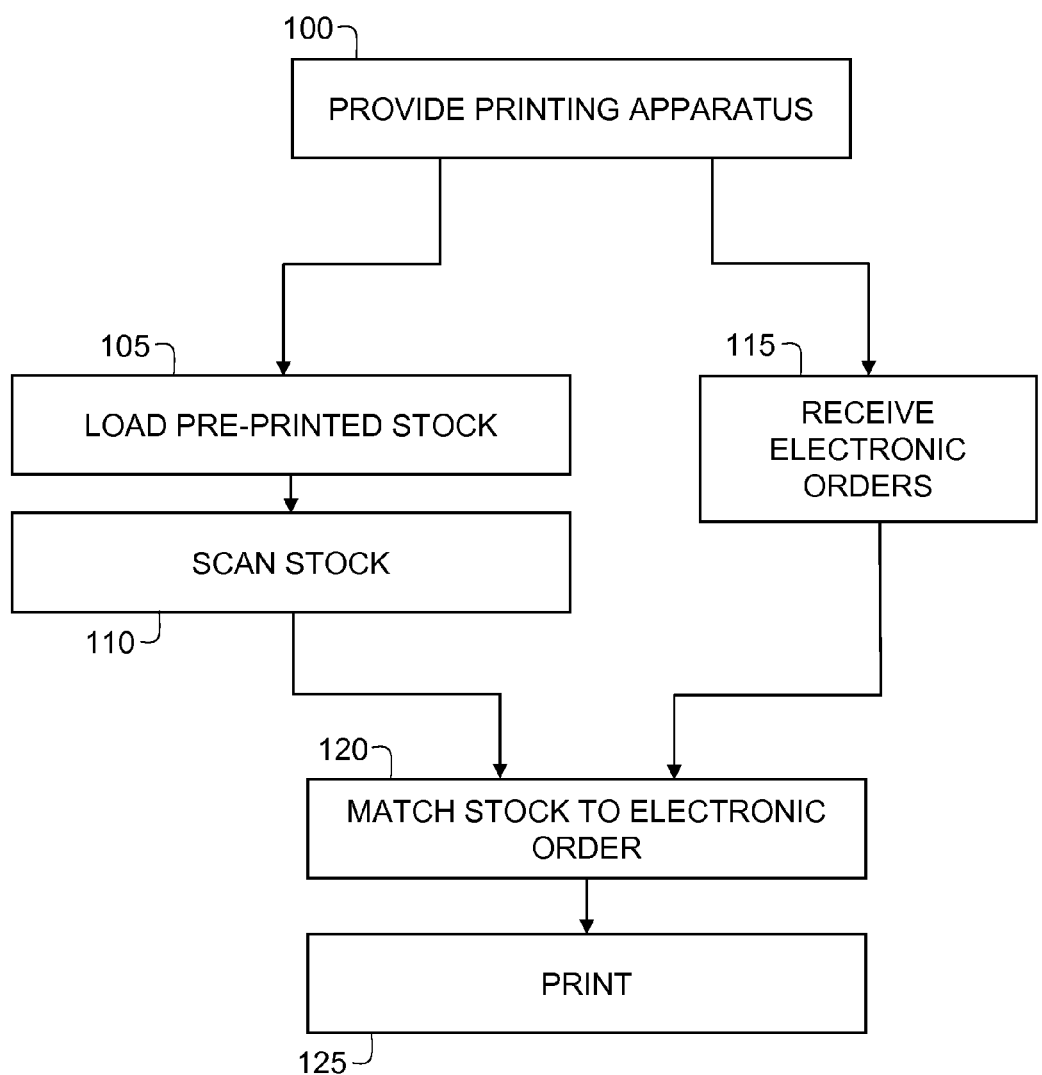
FIG. 7 is a flow diagram illustrating a method according to an embodiment of the present invention.

Referring to FIG. 7, variable customer data can be printed on a large variety of different pre-printed stocks by employing a method according to an embodiment of the present invention comprising the steps of providing a printing apparatus in step 100, for example a printing apparatus 10 such as that illustrated in FIG. 1. Pre-printed stock of a variety of different types can be loaded into a printer, in step 105, the preprinted stock having an open area and a decorative printed area on a common side of the pre-printed stock. The pre-printed stock may have a common size and underlying material (e.g. 5-inch by 7-inch card stock) but have different printing in the printed area. One or more of the pre-printed stocks in the printer tray are scanned with the scanner in step 110 and, after the stock is identified, it is then stored as tray stock information. At the same time as, before, or after the pre-printed stocks are loaded (step 105) and scanned (step 110), the printing apparatus can receive a plurality of different electronic customer orders in step 115. The electronic orders can include unique customer data such as digital images and a selection of pre-printed stock on which the digital image(s) are to be printed. An electronic customer order is matched to the tray stock information describing the available pre-printed stock in step 120. One of the stock information is matched with one of the plurality of different electronic orders to form a match in step 120. Print instructions for the match are produced and the customer data corresponding to the match is printed onto the common side of the matching pre-printed stock in step 125.

In a second embodiment of the present invention, the printers may include several paper or media supply drawers or trays, each containing a different pre-printed, plain or colored stock of various sizes and weights. The user or printer operator loads stock of desired types in the one or more supply drawers or trays. Each supply drawer or tray is typically loaded with only one type of stock. When a supply drawer is loaded with media, the controller will indicate that the stock type information may need to be updated. The printers are typically configured with supply drawer or tray sensors that indicate to the printer controller that the drawer or tray has been restocked. Visual indicators, for example, LEDs, can also be coupled via the sensors so that printer operators can quickly discern that stock is loaded into a tray. The actual media type may be entered by the user or printer operator or preferably according to this embodiment of the invention, the printer will feed the first sheet of the supply to be scanned to produce tray stock information, as described above. The printer controller will use the updated tray stock information in matching future print job requirements before printing. According to this embodiment of the invention the user need not enter the media type thus simplifying the media loading process and eliminating possible user error in entering an incorrect media type and/or loading incorrect media in the paper drawer or tray.

The present invention can be employed to support a large variety of different pre-printed stocks in a printing system adapted to print a large number of unique customer orders, especially those including digital images, without requiring the use of special identifying markings or an impractical number of printers or printer trays of stock. The system is adaptable to a wide variety of pre-printed materials and designs.

The invention has been described in detail with particular reference to certain preferred embodiments thereof, but it will be understood that variations and modifications can be effected within the spirit and scope of the invention.

PARTS LIST 10 printing apparatus
12 customer data
13 digital image
14 pre-printed stock selection
15 printed area
16 open area
17 text
18 printed image product
20 printer tray
22 pre-printed stock
26 electronic customer order
27 messages
28 controller
29 operator interface
30 scanner
32 tray stock information
40 printer
42 match
44 printing instructions
50 network
100 provide printing apparatus step
105 load pre-printed stock step
110 scan stock step
115 receive electronic orders step
120 match stock to electronic order step
125 print step

The invention claimed is:

1. A printing apparatus for variable pre-printed stock, comprising:
   storage configured to store customer data;
   pre-printed stocks, each pre-printed stock having a printed area and an open area on a common side of the pre-printed stock;
   printer trays each configured to hold one of the pre-printed stocks;
   a scanner configured to scan the printed area of each of the pre-printed stocks to form an image of each of the printed areas, to compare each image of the printed areas with different pre-printed stocks, to match each image of the printed areas with one of the different pre-printed stocks, to identify each matched image to produce tray stock information identifying the pre-printed stock, and to store the produced tray stock information identifying the pre-printed stocks;

storage configured to store electronic customer orders, each electronic customer order including one or more of the customer data and selection data for one or more of the pre-printed stocks;

a controller configured to receive the tray stock information and the electronic customer orders, to match the tray stock information to the electronic customer orders to produce an electronic customer order match, and to produce print instructions for the matched electronic customer order; and a printer configured to receive the print instructions and to print the customer data corresponding to the matched electronic customer order onto pre-printed stock identified by the matched electronic customer order.

2. The printing apparatus of claim 1, wherein the customer data includes digital images or text.

3. The printing apparatus of claim 1, wherein the controller includes programming configured to communicate an error message if there is no match between the selection of pre-printed stock and the tray stock information.

4. The printing apparatus of claim 1, wherein the controller includes programming configured to communicate an error message if there is no pre-printed stock in one of the printer trays.

5. The printing apparatus of claim 1, wherein the printer cannot print on the printed areas of the pre-printed stock.

6. The printing apparatus of claim 1, wherein the printed areas are printed with metal film.

7. A method of printing customer data on pre-printed stock, comprising the steps of:

loading pre-printed stocks into a printer, the pre-printed stock having an open area and a printed area;

scanning one or more of the pre-printed stocks with a scanner to form an image of each of the printed areas, comparing each image of the printed areas with different pre-printed stocks, matching each image of the printed areas with one of the different pre-printed stocks, identifying each matched image to produce tray stock information identifying the pre-printed stock, and storing the produced stock tray information identifying the pre-printed stocks;

receiving a plurality of electronic orders in the printer, each order identifying one or more of the pre-printed stocks and including customer data;

matching the stock tray information with one of the plurality of electronic orders to form an electronic order match; and producing print instructions for the electronic order match and printing the customer data corresponding to the electronic order match onto pre-printed stock identified by the electronic order match.

8. The method of claim 7, further comprising the steps of scanning and matching a second one of the one or more pre-printed stocks with a second one of the plurality of electronic orders to form a second match; and producing second print instructions for the second match and printing customer data corresponding to the second match onto the second one of the one or more pre-printed stocks.

9. The method of claim 7, wherein the step of printing the customer data includes the step of printing the customer data only in the open area.

10. The method of claim 7, wherein one of the pre-printed stocks includes a plurality of open areas each surrounded by the printed area and wherein the method further comprises the step of printing the customer data only in the plurality of open areas.

11. A printing apparatus comprising:

one or more stock trays;

one or more sensors to detect that said one or more stock trays are loaded with pre-printed stock, each pre-printed stock having a printed area and an open area on a common side of the pre-printed stock;

a controller coupled to said one or more sensors configured to receive sensor information indicating that said one or more stock trays are loaded with pre-printed stock;

a status indicator configured to indicate that said one or more stock trays are loaded with pre-printed stock;

a scanner configured to scan the stock to form an image of each of the printed areas, to compare each image of the printed areas with different pre-printed stocks, to match each image of the printed areas with one of the different pre-printed stocks, to identify each matched image to produce tray stock information identifying the pre-printed stock, and to produce and store the produced tray stock information to identify the pre-printed stock; and wherein the controller receives the tray stock information.

12. The apparatus of claim 11, wherein the controller further receives order information and generates a match between the order information and the tray stock information.

13. The apparatus of claim 12, further comprising a printer in electronic communication with the controller, wherein the controller further generates print instructions based on the match between the order information and the tray stock information.

14. The apparatus of claim 12, wherein the order information includes an order identifier, customer data, and a stock selection.

15. The apparatus of claim 14, wherein the match is generated based on the stock selection and the tray stock information.

16. The apparatus of claim 13, wherein the stock includes a printed area on one side and an unprinted open area on the one side, wherein the tray stock information includes location data configured to define a location of said open area on the one side, and wherein the controller generates the print instructions based on the location data to be use by the printer such that the customer data is printed only in the unprinted open area.

17. The apparatus of claim 16, wherein the printed area is pre-printed using a decorative metal film that is incompatible with an ink or a toner used by the printer.

18. The apparatus of claim 13, wherein the stock includes a printed area on one side and a plurality of unprinted open areas on the one side, wherein the tray stock information includes location data configured to define locations of the plurality of unprinted open areas on the one side, and wherein the controller generates the print instructions based on the location data to be use by the printer such that the customer data is printed only in the plurality of unprinted open areas.

* * * * *